United States Patent
Kushion et al.

(10) Patent No.: US 6,914,399 B2
(45) Date of Patent: Jul. 5, 2005

(54) ACTIVE DEADTIME CONTROL FOR IMPROVED TORQUE RIPPLE PERFORMANCE IN ELECTRIC MACHINES

(75) Inventors: Mark D. Kushion, Saginaw, MI (US); Dennis B. Skellenger, Vassar, MI (US)

(73) Assignee: Delphi Technologies, Troy, MI (US)

(*) Notice: Subject to any disclaimer, the term of this patent is extended or adjusted under 35 U.S.C. 154(b) by 150 days.

(21) Appl. No.: 10/269,740

(22) Filed: Oct. 14, 2002

(65) Prior Publication Data

US 2004/0007999 A1 Jan. 15, 2004

Related U.S. Application Data

(60) Provisional application No. 60/394,484, filed on Jul. 9, 2002.

(51) Int. Cl.$^7$ ................................................ H02P 1/04
(52) U.S. Cl. ...................... 318/434; 318/254; 318/437; 318/715; 318/801; 318/810
(58) Field of Search ................................. 318/434, 254, 318/437, 713, 801, 810, 715

(56) References Cited

U.S. PATENT DOCUMENTS

| | | | | |
|---|---|---|---|---|
| 4,782,272 A | * | 11/1988 | Buckley et al. ............. | 318/254 |
| 5,258,696 A | | 11/1993 | Le ............................... | 318/254 |
| 5,450,306 A | * | 9/1995 | Garces et al. ................. | 363/41 |
| 5,726,558 A | * | 3/1998 | Umeda et al. ................ | 322/27 |
| 5,811,949 A | | 9/1998 | Garces ......................... | 318/448 |
| 5,872,710 A | * | 2/1999 | Kameyama ................... | 363/95 |
| 5,917,721 A | | 6/1999 | Kerkman et al. ............. | 363/98 |
| 5,977,741 A | * | 11/1999 | DeLange et al. ........... | 318/801 |
| 6,426,602 B1 | * | 7/2002 | McCann et al. ............. | 318/432 |
| 6,498,451 B1 | * | 12/2002 | Boules et al. ............... | 318/661 |
| 6,501,243 B1 | * | 12/2002 | Kaneko et al. .............. | 318/700 |
| 6,580,627 B2 | * | 6/2003 | Toshio .......................... | 363/98 |
| 2003/0066286 A1 | * | 4/2003 | Mir et al. .................... | 318/254 |

\* cited by examiner

*Primary Examiner*—Rita Leykin
(74) *Attorney, Agent, or Firm*—Michael D. Smith

(57) ABSTRACT

A method for implementing active deadtime control of an inverter associated with an electric motor is disclosed. In an exemplary embodiment, the method includes receiving a command voltage signal indicative of a desired load to be driven by the motor. Based upon the value of the command voltage signal, a determined value of deadtime is applied to switching circuitry in the inverter, wherein the value of deadtime relates to an amount of time in which the switching of a device in the switching circuitry is delayed so as to prevent a short circuit condition within the inverter.

10 Claims, 4 Drawing Sheets

ACTIVE DEADTIME CONTROL FOR IMPROVED TORQUE RIPPLE PERFORMANCE IN ELECTRIC MACHINES

CROSS-REFERENCE TO RELATED APPLICATIONS

This application claims the benefit of U.S. Provisional Application No. 60/394,484, filed Jul. 9, 2002 the contents of which are incorporated by reference herein in their entirety.

BACKGROUND

The present disclosure relates generally to automobile steering systems and, more particularly, to a method of implementing active deadtime control of switching inverters associated with electric machines, such as electric power steering (EPS) motors, for improved torque ripple performance.

Electric power steering (EPS) has been recently implemented in motor vehicles to improve fuel economy and has even started to replace hydraulic power steering in certain vehicles. One way to accomplish improved fuel economy is through the reduction or elimination of losses inherent in traditional steering systems. To this end, electric power steering requires power only on demand. Commonly, in such EPS systems, an electronic controller is also configured to require significantly less power under a small or no steering input condition. This dramatic decrease from conventional steering assist is the basis of the power and fuel savings.

A polyphase permanent magnet (PM) brushless motor is typically used in EPS systems as the actuator for providing a mechanical assist to the steering mechanism of a vehicle. Such a motor is generally excited with a sinusoidal field to provide lower torque ripple, noise, and vibration as compared to those motors excited with a trapezoidal field. Theoretically, if a motor controller produces polyphase sinusoidal currents with the same frequency and phase as that of the sinusoidal back electromotive force (EMF), the torque output of the motor will be a constant, and zero torque ripple will be achieved. However, due to practical limitations of motor design and controller implementation, there are always deviations from pure sinusoidal back EMF and current waveforms. These deviations usually result in parasitic torque ripple components at certain frequencies and magnitudes. Various methods of torque control can influence the magnitude and characteristics of this torque ripple.

In EPS drive systems based on a voltage mode controlled sinusoidal PM drive, a full bridge power inverter is employed to apply a pulse width modulated (PWM) voltage across the motor phases. Unfortunately, these inverters (particularly those used for sinusoidal brushless motors) suffer from several linearity issues. One such linearity issue results from the application of deadtime in the switching of the inverter's power transistors. The term "deadtime" refers to the amount of time during which there is a delay in the turning on/off of a particular transistor pair. The intent of deadtime is to avoid potential short circuits across the power supply of the EPS motor resulting from propagation delays and errors in the timing of the turn on (conduction) and turn off of the transistors. Accordingly, it is desirable to reduce the effects of torque ripple and non-linearity associated with the application of deadtime to the inverter switching circuitry, thereby enhancing the overall performance of the EPS system.

SUMMARY

The above discussed and other drawbacks and deficiencies of the prior art are overcome or alleviated by a method for implementing active deadtime control of an inverter associated with an electric motor. In an exemplary embodiment, the method includes receiving a command voltage signal indicative of a desired load to be driven by the motor. Based upon the value of the command voltage signal, a determined value of deadtime is applied to switching circuitry in the inverter, wherein the value of deadtime relates to an amount of time in which the switching of a device in the switching circuitry is delayed so as to prevent a short circuit condition within the inverter.

Preferably, the value of deadtime decreases as the value of the command voltage decreases. In addition, the value of deadtime is obtained through a lookup table. The value of said command voltage signal is adjusted in response to the value of deadtime, thereby producing a compensated command voltage signal to be applied to the motor through the switching circuitry in the inverter.

In another aspect, a method for controlling an inverter associated with a brushless electric motor includes generating a command voltage signal indicative of a desired load to be driven by the motor, the command voltage signal based upon an input torque command signal and a motor speed signal. Based upon the value of the command voltage signal, a value of deadtime to be applied to switching circuitry included within the inverter is determined. The value of deadtime relates to an amount of time in which the switching of a device in the switching circuitry is delayed so as to prevent a short circuit condition within the inverter.

In still another aspect, an electric power steering system includes a steering input device coupled to one or more steerable wheels, and an assist actuator including an electric motor for providing an assist torque to the one or more steerable wheels, the motor further including an inverter for applying a series of phase voltages thereto. A controller for generates a set of control signals to be applied to the inverter. The controller further includes means for receiving a command voltage signal indicative of a desired load to be driven by said electric motor, and means for determining, based upon the value of the command voltage signal, a value of deadtime to be applied to switching circuitry in the inverter. The value of deadtime relates to an amount of time in which the switching of a device in the switching circuitry is delayed so as to prevent a short circuit condition within the inverter.

BRIEF DESCRIPTION OF THE DRAWINGS

Referring to the exemplary drawings wherein like elements are numbered alike in the several Figures.

DETAILED DESCRIPTION

Disclosed herein is a method of implementing active deadtime control of an inverter associated with an electric machine. Briefly stated, the method allows for improved motor and torque control at low motor loads by changing the amount of deadtime between the switching of transistors, based upon the load condition. If the motor operating condition is such that a lower deadtime can be used, then an algorithm in the control system sends out a reduced deadtime signal to the motor control logic, thereby reducing the disturbance of the motor control waveforms. If however the operating conditions are such that a higher motor torque or speed is needed to attain the EPS system objectives, then the algorithm will increase the deadtime to reduce the risk of damage to the transistors due to "shoot-through".

Figure 1:
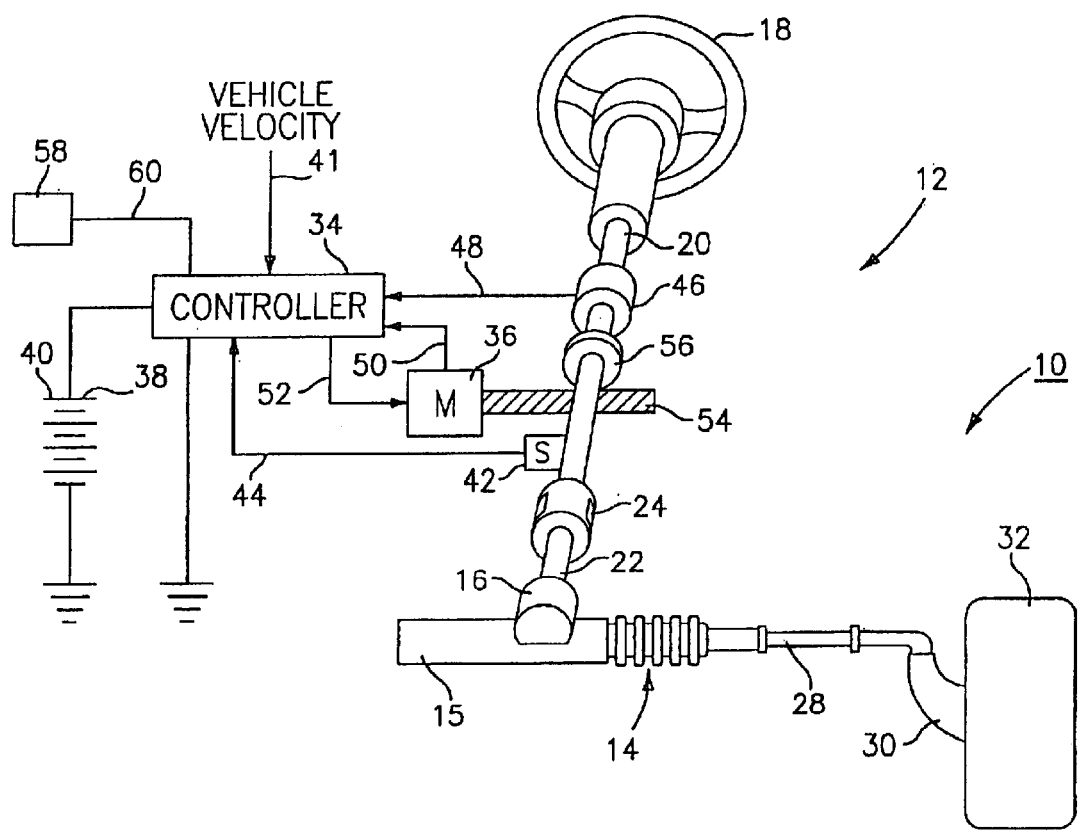
FIG. 1 is a schematic diagram of a motor vehicle provided with an electric power steering system, suitable for practicing an embodiment of the present disclosure.

Referring initially to FIG. 1, there is shown a representative environment for practicing an embodiment of the present disclosure, in which a motor vehicle 10 is provided with an electric power steering system 12. The electric power steering system 12 may include a conventional rack and pinion steering mechanism 14 having a toothed rack 15 and a pinion gear (not shown) under a gear housing 16. As the steering wheel 18 is turned, an upper steering shaft 20 turns a lower shaft 22 through a universal joint 24. The lower steering shaft 22 turns the pinion gear. The rotation of the pinion gear moves the toothed rack 15, which then moves tie rods 28 (only one shown). In turn, tie rods 28 move steering knuckles 30 (only one shown) to turn wheels 32.

An electric power assist is provided through a controller 34 and a power assist actuator comprising a motor 36. The controller 34 receives electric power from a vehicle electric power source 38 through a connection 40. The controller 34 also receives a signal 41 representative of the vehicle velocity, as well as steering pinion gear angle signal 44 from a rotational position sensor 42. As the steering wheel 18 is turned, a torque sensor 46 senses the torque applied to steering wheel 18 by the vehicle operator and provides an operator torque signal 48 to the controller 34. In addition, as the rotor of motor 36 turns, rotor position signals 50 are generated within the motor 36 and are also provided to the controller 34. In response to vehicle velocity, operator torque, steering pinion gear angle and rotor position signals received, the controller 34 derives desired motor phase voltages. The motor phase voltages are provided to motor 36 through a bus 52, thereby providing torque assist to steering shaft 20 through worm 54 and worm gear 56. As is described in greater detail later, the controller 34 is configured to develop the necessary voltage(s) to be applied to the motor 36 such that the desired torque is generated. Accordingly, a storage medium 58 may be used to contain instructions for executing a computer-implemented process within controller 34, through the transmission of data signal(s) 60 therebetween.

Figure 2:
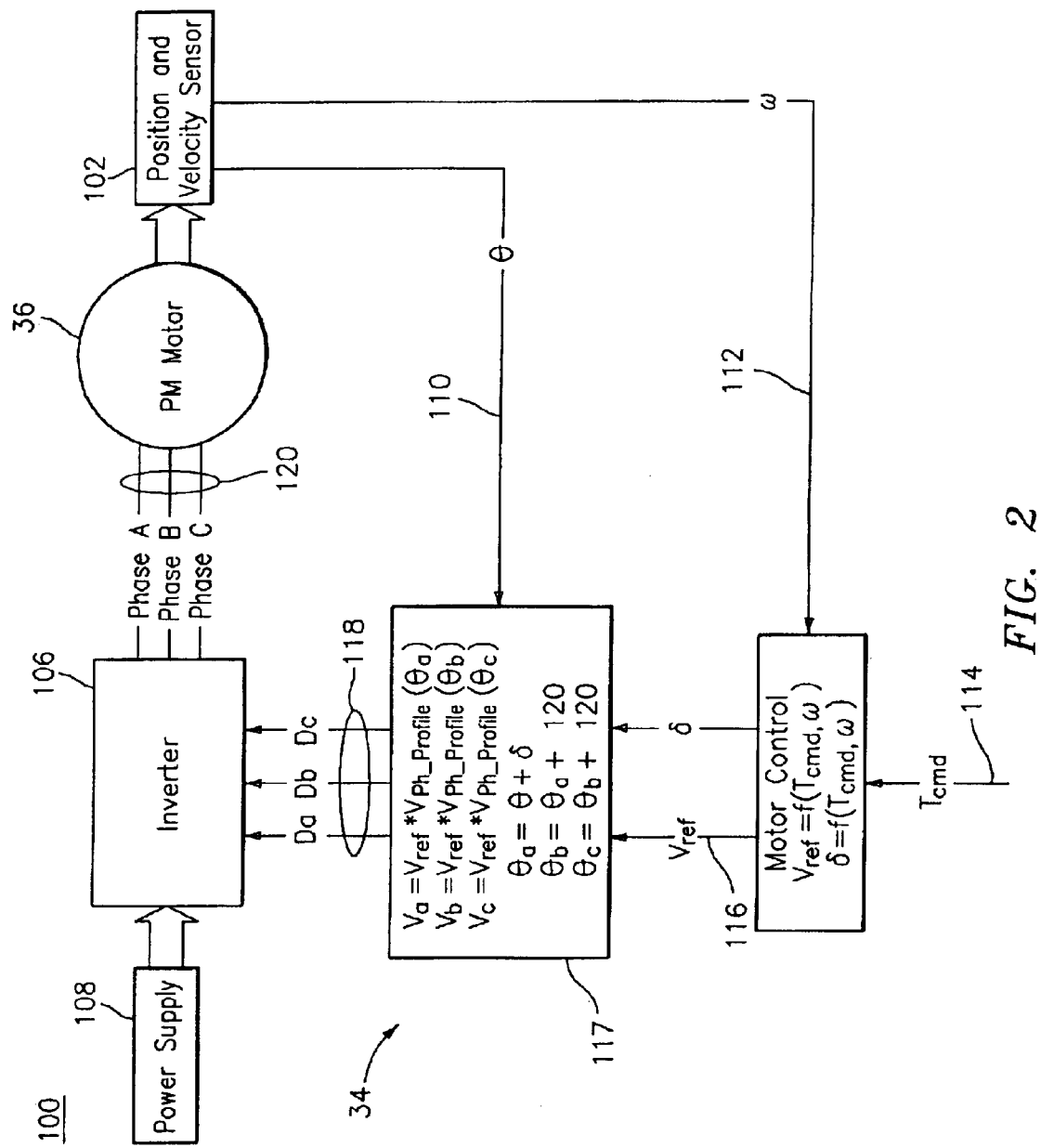
FIG. 2 is a block diagram of an exemplary PM motor control system that may be used for controlling the torque of a sinusoidally excited PM electric machine, such as the EPS motor in FIG. 1.

FIG. 2 is a block diagram of an exemplary PM motor control system 100 that may be used for controlling the torque of a sinusoidally excited PM electric machine, such as the EPS motor 36 of FIG. 1. The control system 100 includes (but is not limited to) motor 36, a motor rotor position/velocity sensor assembly 102, the controller 34, a power circuit or inverter 106 and power supply 108. The velocity sensing portion of sensor assembly 102 may be embodied by a circuit or algorithm, for example. Again, the controller 34 is configured and connected to develop the necessary voltage(s) out of inverter 106 such that, when applied to the motor 36, the desired torque is generated. Because these voltages are related to the position and speed of the motor 36, the position and speed of the motor rotor are determined by the system 100. The sensor assembly 102 is connected to the motor 36 to detect the angular position, θ, of the rotor. The sensor assembly 102 may sense the rotary position based on optical detection, magnetic field variations, or other methodologies. Exemplary position sensors include potentiometers, resolvers, synchros, encoders, and the like. The sensor assembly 102 outputs a position signal 110 indicating the angular position of the rotor.

Again, the motor speed (denoted ω) may be measured, calculated, or otherwise derived from a combination thereof. For example, the motor speed ω is calculated as the change of the motor position θ as measured by the sensor assembly 102 over a prescribed time interval. Alternatively, the motor speed ω may be determined as the derivative of the motor position θ from the equation ω=Δθ/Δt, where Δt is the sampling time and Δθ is the change in position during the sampling interval. In FIG. 2, the sensor assembly 102 determines the speed of the rotor and outputs a corresponding speed signal 112.

The position signal 110, speed signal 112, and a torque command signal 114 are each applied to the controller 34. The torque command signal 114 is representative of the desired motor torque value for the assist motor 36. The controller 34 then determines a command voltage amplitude $V_{ref}$ (shown as signal 116) and its phase advance angle δ needed to develop the desired torque according to the torque command signal 114, the position signal 110 and the speed signal 112, as well as other fixed motor parameter values. Although not shown specifically in FIG. 2, the controller 34 may also include a linearization function block that provides a linearization offset function for $V_{ref}$ 116 in order to minimize torque ripple.

For a three-phase motor, three sinusoidal reference signals that are synchronized with the motor back EMF are utilized to generate the motor input voltages. The controller 34 thus transforms the command voltage amplitude signal $V_{ref}$ 116 into three phases as shown in function block 117 by determining individual phase voltage command signals $V_a$, $V_b$, and $V_c$ from the command voltage amplitude signal 116 and the position signal 110 according to the following equations:

$$V_a = V_{ref} * V_{ph\_Profile}(\theta_a)$$

$$V_b = V_{ref} * V_{ph\_Profile}(\theta_b)$$

$$V_c = V_{ref} * V_{ph\_Profile}(\theta_c)$$

where $V_{ph\_Profile}(\theta_a)$, $V_{ph\_Profile}(\theta_b)$, $V_{ph\_Profile}(\theta_c)$ are profile voltages generated from the sine functions as shown in the following equations:

$$V_{ph\_Profile}(\theta_a) = \sin(\theta_a) - \min[\sin(\theta_a), \sin(\theta_b), \sin(\theta_c)]$$

$$V_{ph\_Profile}(\theta_b) = \sin(\theta_b) - \min[\sin(\theta_a), \sin(\theta_b), \sin(\theta_c)]$$

$$V_{ph\_Profile}(\theta_c) = \sin(\theta_c) - \min[\sin(\theta_a), \sin(\theta_b), \sin(\theta_c)]$$

These functions are used to generate a phase to grounding phase voltage waveform. More particularly, the functions may be generated from the sine functions off line and stored in a tabular form (such as in a look-up table), or they may be calculated directly using the above equations. $\theta_a$, $\theta_b$, and $\theta_c$ are the individual phase voltage angles, shifted by 120 electrical degrees from one another, such that:

$$\theta_a = \theta_a + \delta$$

$$\theta_b = \theta_a + 120°$$

$$\theta_c = \theta_b + 120°$$

In a motor drive system employing phase advancing, the phase advancing angle δ may also be calculated as a function of the input signal for torque or speed. The phase advancing angle δ is defined as the angle between the phase voltage vector V and back electromotive force (EMF) vector E as generated by the motor 36 as it rotates. The phase voltage signals $V_a$, $V_b$, and $V_c$ are phase shifted by the phase advancing angle δ. Phase voltage command signals $V_a$, $V_b$, and $V_c$ are used to generate the motor duty cycle commands $D_a$, $D_b$, and $D_c$ 118 using an appropriate pulse width modulation (PWM) technique. Motor duty cycle commands 118 of the controller 34 are processed into on-off control command signals applied to the respective switching devices of the power circuit or inverter 106, which is coupled with a power supply 108 to apply modulated phase voltage signals 120 to the stator windings of the motor in response to the motor voltage command signals.

Figure 3:
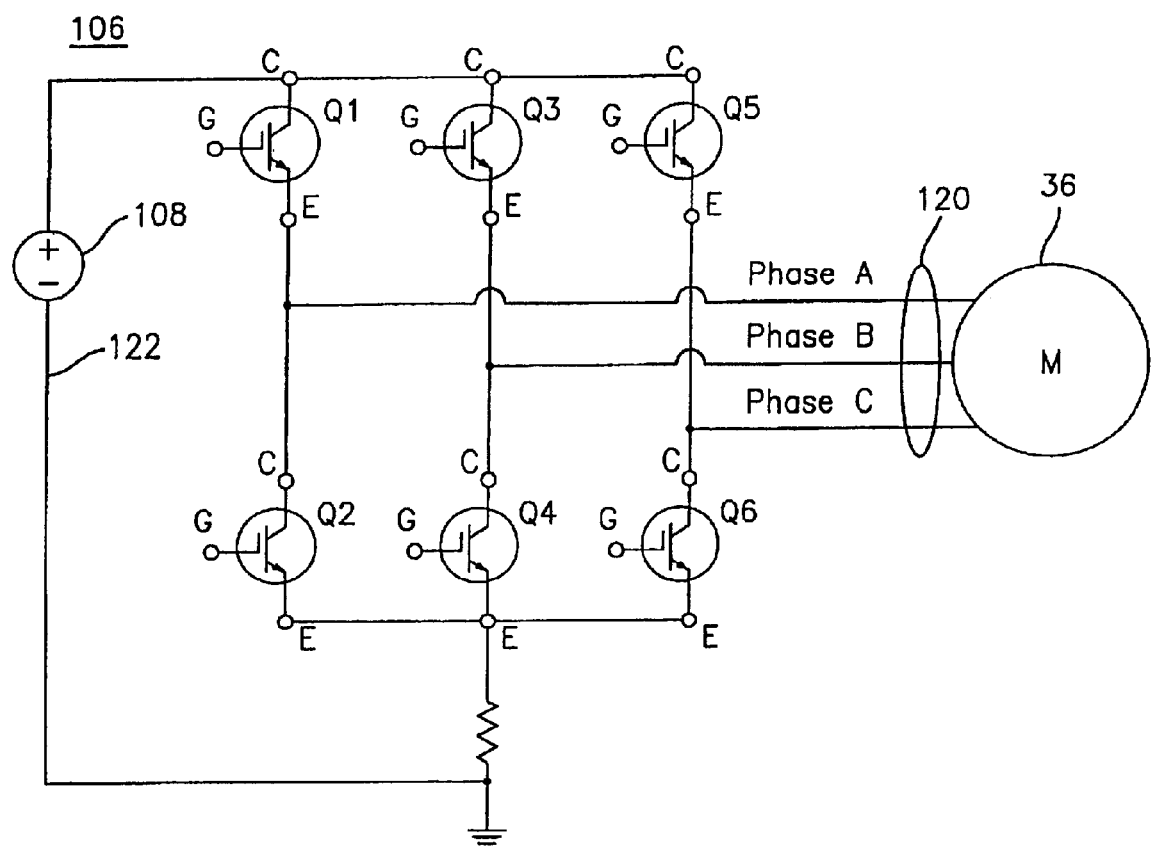
FIG. 3 is a schematic diagram of an exemplary inverter circuit used on the PM motor control system of FIG. 2.

FIG. 3 is a schematic diagram of an exemplary inverter control circuit as generally depicted in FIG. 2. As can be seen, the inverter 106 includes three pairs of switching devices Q1–Q2, Q3–Q4 and Q5–Q6 (one pair for each motor phase) connected in series across a DC bus 122. The switching devices Q1–Q6 may be power transistors such as MOSFETs or IGBTs as shown in the figure. The transistors are complementary switched for each phase such that two transistors (not from the same pair) are switched on at any instant in time. Thus, a deadtime is added to allow for a given two of the transistors to be completely turned off (e.g., Q1 and Q4) before another two are turned on (e.g. Q3 and Q6), thereby prevent the possibility of creating a short circuit across the DC bus (e.g., through Q3 and Q4).

Figure 4:
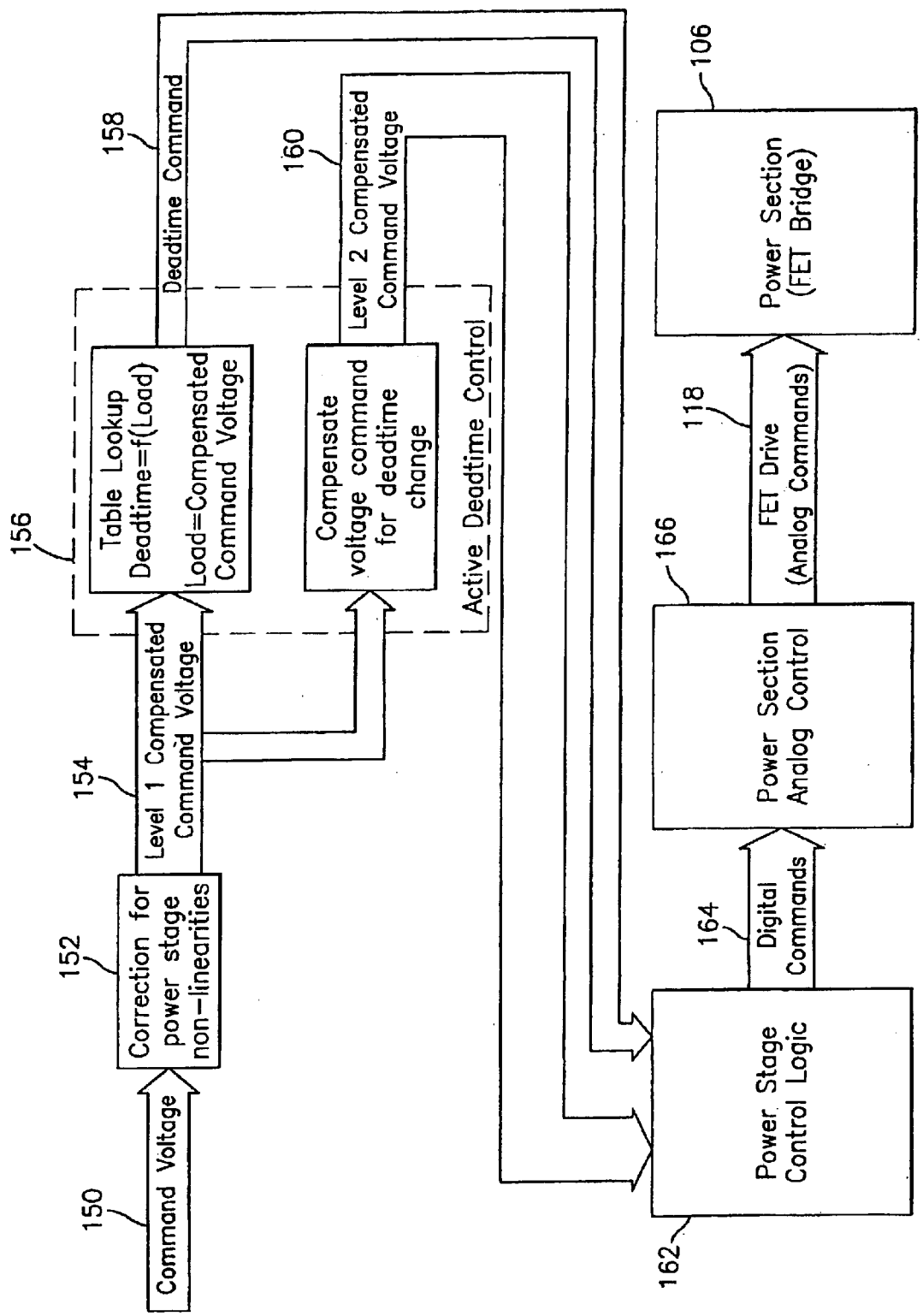
FIG. 4 is a block diagram illustrating the implementation of an active deadtime control block in conjunction with the PM motor control system of FIG. 2, in accordance with an embodiment of the invention.

As stated previously, there is generated considerable torque ripple (in addition to fairly non linear torque output versus command voltages) as the result of deadtime and switching time associated with the power transistors Q1–Q6 of the inverter 106. Accordingly, FIG. 4 is a block diagram illustrating an active deadtime control method, which further modifies the commanded voltage generated in FIG. 2. Initially, the command voltage signal 150 (based upon the torque command signal, $T_{cmd}$, and motor speed, ω) is inputted into a first linearization block 152 to correct for non-linearities in the power stage of the control circuitry. The output of first linearization block 152 is a first level compensated command voltage 154, which is then inputted into an active deadtime control block 156.

In a first aspect, the active deadtime control block 156 produces a deadtime command 158 by accessing a lookup table to determine what the deadtime for the inverter circuitry should be, based upon the load condition of the motor 36. The load condition of the motor 36, in turn, is based on the value of the first level compensated command voltage 154. The lower the value of the motor load (and hence the first level compensated command voltage 154), the shorter the deadtime may be. Conversely, the higher the value of the motor load, the longer the deadtime is. Because the shoot through effect is additive with respect to load current, it is more tolerable at low motor loads and currents. Thus, a shorter deadtime may be used without significant increased risk of transistor damage.

In another aspect, the active deadtime control block 156 also provides a second level of voltage compensation as a result of a change in deadtime. Thus, a second output from the active deadtime control block 156 is a second level compensated command voltage 160. The second level compensated command voltage 160, being dependent upon the applicable deadtime command 158, is therefore dependent upon the motor load and thus the first level compensated command voltage 154.

Once determined, both the deadtime command 158 and the second level compensated command voltage 160 are sent to a power stage control logic block 162, wherein digital commands 164 are generated which carry both deadtime information and compensated motor command voltage information to be applied to the inverter circuitry. Finally, the digital commands 164 are inputted into an analog control block 166, which converts the digital commands 164 and the transistor gate drive information into appropriate analog voltage and current levels, thereby providing the motor duty cycle commands $D_a$, $D_b$, and $D_c$ 118 to drive the inverter circuitry.

Through the use of the above described active deadtime control method, improved motor control and torque ripple at low motor loads may be achieved. When used in conjunction with an EPS system, there is an improved on-center steering performance, without an increase in cost due to more expensive transistors or sophisticated transistor drive circuitry, as the adjustments to the motor drive commands are made algorithmically. It will be appreciated, however, that the present method need not be limited to control of assist motors in steering systems. Rather, the present disclosure may apply to other systems wherein improved motor control and torque ripple is of concern.

As will also be appreciated, the disclosed invention can be embodied in the form of computer or controller implemented processes and apparatuses for practicing those processes. The present invention can also be embodied in the form of computer program code containing instructions embodied in tangible media 58, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal 60, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing active deadtime control of an inverter associated with an electric motor, the method comprising:

receiving a command voltage signal indicative of a desired load to be driven by the motor;

determining, based upon the value of said command voltage signal, a value of deadtime to be applied to switching circuitry in the inverter;

adjusting the value of said command voltage signal in response to said value of deadtime, thereby producing a compensated command voltage signal to be applied to the motor through the switching circuitry in the inverter; and wherein said value of deadtime relates to an amount of time in which the switching of a device in the switching circuitry is delayed so as to prevent a short circuit condition within the inverter.

2. The method of claim 1, wherein said value of deadtime decreases as the value of said command voltage signal decreases.

3. The method of claim 1, wherein said value of deadtime is obtained through a lookup table.

4. A method for controlling an inverter associated with a brushless electric motor, the method comprising:

generating a command voltage signal indicative of a desired load to be driven by the motor, said command voltage signal based upon an input torque command signal and a motor speed signal;

determining, based upon the value of said command voltage signal, a value of deadtime to be applied to switching circuitry included within the inverter;

adjusting the value of said command voltage signal in response to said value of deadtime, thereby producing a compensated command voltage signal to be applied to the motor through the switching circuitry in the inverter; and wherein said value of deadtime relates to an amount of time in which the switching of a device in the switching circuitry is delayed so as to prevent a short circuit condition within the inverter.

5. The method of claim 4, wherein said value of deadtime decreases as the value of said command voltage signal decreases.

6. The method of claim 4, wherein said value of deadtime is obtained through a lookup table.

7. The method claim 4, further comprising:

inputting said command voltage signal into a linearization block, thereby producing a first level compensated command voltage therefrom; and inputting said first level compensated command voltage into an active deadtime control block, thereby producing a deadtime command signal and a second level compensated command voltage therefrom.

8. An electric power steering system, comprising:

a steering input device coupled to one or more steerable wheels;

an assist actuator including an electric motor for providing an assist torque to said one or more steerable wheels, said motor further including an inverter for applying a series of phase voltages thereto; and a controller for generating a set of control signals to be applied to said inverter, said controller further comprising:

means for receiving a command voltage signal indicative of a desired load to be driven by said electric motor;

means for determining, based upon the value of said command voltage signal, a value of deadtime to be applied to switching circuitry in said inverter;

means for adjusting the value of said command voltage signal in response to said value of deadtime, thereby producing a compensated command voltage signal to be applied to the motor through the switching circuitry in the inverter; and wherein said value of deadtime relates to an amount of time in which the switching of a device in said switching circuitry is delayed so as to prevent a short circuit condition within said inverter.

9. A storage medium, comprising:

a machine readable computer program code for implementing active deadtime control of an inverter associated with an electric motor; and instructions for causing a computer to implement a method, the method further comprising:

receiving a command voltage signal indicative of a desired load to be driven by the motor;

determining, based upon the value of said command voltage signal, a value of deadtime to be applied to switching circuitry in the inverter;

adjusting the value of said command voltage signal in response to said value of deadtime, thereby producing a compensated command voltage signal to be applied to the motor through the switching circuitry in the inverter; and wherein said value of deadtime relates to an amount of time in which the switching of a device in the switching circuitry is delayed so as to prevent a short circuit condition within the inverter.

10. A computer data signal, comprising:

code configured to cause a processor to implement a method for implementing active deadtime control of an inverter associated with an electric motor, the method further comprising:

receiving a command voltage signal indicative of a desired load to be driven by the motor;

determining, based upon the value of said command voltage signal, a value of deadtime to be applied to switching circuitry in the inverter;

adjusting the value of said command voltage signal in response to said value of deadtime, thereby producing a compensated command voltage signal to be applied to the motor through the switching circuitry in the inverter; and wherein said value of deadtime relates to an amount of time in which the switching of a device in the switching circuitry is delayed so as to prevent a short circuit condition within the inverter.

* * * * *